United States Patent
Ka et al.

(10) Patent No.: US 12,545,767 B2
(45) Date of Patent: Feb. 10, 2026

(54) POLYVINYLIDENE CHLORIDE (PVDC)-BASED COMPOSITE HAVING CORE-SHELL STRUCTURE AND METHOD FOR MANUFACTURING SAME

(71) Applicant: Weifang Yaxing Chemical Co., Ltd., Weifang (CN)

(72) Inventors: Duyoun Ka, Daejeon (KR); Taewook Kwon, Daejeon (KR); Soonmin Kwon, Daejeon (KR); Byoungcheon Jo, Daejeon (KR); Jeonghoon Jeun, Daejeon (KR); Yongnam Joe, Daejeon (KR)

(73) Assignee: Weifang Yaxing Chemical Co., Ltd., Weifang (CN)

( * ) Notice: Subject to any disclaimer, the term of this patent is extended or adjusted under 35 U.S.C. 154(b) by 490 days.

(21) Appl. No.: 18/028,253

(22) PCT Filed: Sep. 24, 2021

(86) PCT No.: PCT/KR2021/013024
§ 371 (c)(1),
(2) Date: Mar. 24, 2023

(87) PCT Pub. No.: WO2022/065907
PCT Pub. Date: Mar. 31, 2022

(65) Prior Publication Data
US 2023/0374231 A1 Nov. 23, 2023

(30) Foreign Application Priority Data
Sep. 25, 2020 (KR) .................. 10-2020-0124442

(51) Int. Cl.
*B65D 65/38* (2006.01)
*C08J 3/12* (2006.01)
(Continued)

(52) U.S. Cl.
CPC .............. *C08J 3/126* (2013.01); *B65D 65/38* (2013.01); *C08J 5/18* (2013.01); *C08L 27/08* (2013.01);
(Continued)

(58) Field of Classification Search
CPC combination set(s) only.
See application file for complete search history.

(56) References Cited

U.S. PATENT DOCUMENTS 4,046,728 A * 9/1977 Harmuth .............. C09D 127/06
525/185
5,843,524 A * 12/1998 Wimolkiatisak ......... C08J 3/203
427/222

(Continued)

FOREIGN PATENT DOCUMENTS

JP H354244 A 3/1991
JP H8134242 A 5/1996
(Continued)

*Primary Examiner* — Peter A Salamon
(74) *Attorney, Agent, or Firm* — The Webb Law Firm (57) ABSTRACT

The present invention relates to a polyvinylidene chloride (PVDC)-based composite and a method for preparing the same. The PVDC-based composite includes a core including a PVDC-based polymer; and a shell surrounding the core and including wax. The wax is nano-sized particles.

16 Claims, 2 Drawing Sheets

(51) Int. Cl.
  *C08J 5/18* (2006.01)
  *C08L 27/08* (2006.01)
(52) U.S. Cl.
  CPC ..... *B65D 2565/387* (2013.01); *C08J 2327/08* (2013.01); *C08J 2491/06* (2013.01); *C08L 2207/53* (2013.01)

(56) References Cited

U.S. PATENT DOCUMENTS

| | | | | |
|---|---|---|---|---|
| 2005/0175932 A1* | 8/2005 | Sampei | ............... | G03F 7/06 430/270.1 |
| 2012/0235074 A1* | 9/2012 | Iftime | ............... | C09C 1/62 252/62.55 |
| 2012/0236092 A1* | 9/2012 | Iftime | ............... | C09D 11/34 977/773 |

FOREIGN PATENT DOCUMENTS

| | | | |
|---|---|---|---|
| JP | 2002514672 A | | 5/2002 |
| JP | 2003098630 A | * | 4/2003 |
| JP | 2009269218 A | | 11/2009 |
| JP | 2010539289 A | | 12/2010 |
| KR | 1020040079344 A | | 9/2004 |
| KR | 1020090039117 A | | 4/2009 |
| KR | 1020190094848 A | | 8/2019 |
| KR | 102154464 B1 | | 9/2020 |

* cited by examiner

POLYVINYLIDENE CHLORIDE (PVDC)-BASED COMPOSITE HAVING CORE-SHELL STRUCTURE AND METHOD FOR MANUFACTURING SAME

CROSS-REFERENCE TO RELATED APPLICATIONS

This application is the United States national phase of International Patent Application No. PCT/KR2021/013024 filed Sep. 24, 2021, and claims priority to Korean Patent Application No. 10-2020-0124442 filed Sep. 25, 2020, the disclosures of which are hereby incorporated by reference in their entireties.

BACKGROUND OF THE INVENTION

Field of the Invention

The present invention relates to a polyvinylidene chloride (PVDC)-based composite having a core-shell structure, a method for preparing the same, and a resin composition and food packaging film comprising the same.

Description of Related Art

In the field of food packaging, when products sensitive to oxygen or moisture are packaged, contact with oxygen and moisture should be prevented in order to prevent food spoilage, and therefore a general food packaging film includes a barrier layer. Among barrier materials, polyvinylidene chloride (PVDC) has excellent oxygen and moisture barrier properties, and in the cases of barrier materials such as ethylene vinyl alcohol (EVOH) and nylon, the oxygen barrier property is rapidly deteriorated when the ambient humidity is high, whereas PVDC exhibits excellent barrier properties regardless of humidity. Therefore, PVDC has been used in a film for packaging food such as retort food that requires a sterilization process using water or is used in hot and humid climates.

It is difficult to subject PVDC to thermal processing such as extrusion molding due to its structural characteristics. In ($CH_2Cl_2$), which is a repeating structure of a polymer chain, the C—Cl bond energy is significantly low, and thus an elimination reaction of HCl occurs easily. When HCl is eliminated, a double bond is formed at a site where HCl is eliminated, a Cl and allyl chloride structure as a next repeating structure is formed, and in this structure, the elimination reaction of HCl may occur more easily and the elimination reaction is accelerated. As a result, polyenes having consecutive double bonds are formed, and a black aromatic carbon is finally formed by a Diels-Alder reaction between the polyenes. Such a carbide adheres to the inside of an extruder or die, which causes non-uniformity in a thickness of a film or difficulties in film processing due to the carbide appearing as a black foreign matter on the film.

In addition, porous properties of PVDC particles cause feeding non-uniformity due to a reduction in flowability during the extrusion process, resulting in a different amount of extruded product and consequently a deviation in film thickness. More seriously, feeding failure may occur due to bridging of powder particles. This is because the PVDC melt that enters first cannot come out of the extruder and stays in the extruder and receives heat. Accordingly, the decomposition reaction of PVDC described above is accelerated, and carbides are excessively accumulated inside the extruder, which may cause serious contamination. In addition, generation and accumulation of a large amount of HCl gas may cause contamination of the working environment and pose a threat to the safety of workers. Furthermore, HCl gas, which is a heavy gas, sinks to the bottom, and may cause an explosion due to sparks in power supplies and mechanical devices.

SUMMARY OF THE INVENTION

Technical Problem

An object of the present invention is to provide a polyvinylidene chloride (PVDC)-based composite having improved flowability and a method for preparing the same.

Another object of the present invention is to provide a PVDC-based composite for manufacturing a film having a uniform thickness by preventing feeding non-uniformity of a raw material due to a high surface roughness of a PVDC particle during extrusion molding for manufacturing a PVDC film.

Still another object of the present invention is to provide a PVDC-based composite for preventing generation of HCl gas by suppressing acceleration of PVDC decomposition due to feeding non-uniformity of a PVDC raw material in a manufacturing process of a PVDC film.

Technical Solution

In one general aspect, a polyvinylidene chloride (PVDC)-based composite includes: a core containing a PVDC-based polymer; and a shell surrounding the core and containing wax, wherein the wax is nano-sized particles.

In an embodiment according to the present invention, a particle size of the wax may be 30 to 280 nm.

In an embodiment according to the present invention, the wax may be one or more selected from the group consisting of petroleum/coal-derived wax extracted from petroleum or coal, animal and vegetable wax, amide-based synthetic wax, olefin-based synthetic wax, and modified wax thereof.

In an embodiment according to the present invention, the wax may be two or more types of wax including acrylic wax.

In an embodiment according to the present invention, a thickness of the shell may be 30 nm to 10 µm.

In an embodiment according to the present invention, the PVDC-based polymer may be one or more selected from the group consisting of a homopolymer and a copolymer that contain vinylidene chloride (VDC).

In an embodiment according to the present invention, the PVDC-based polymer may be a copolymer containing one or more comonomers selected from the group consisting of vinyl chloride (VC) and methyl acrylate (MA).

In an embodiment according to the present invention, the PVDC-based polymer may contain 2 to 25 wt % of the comonomers.

In an embodiment according to the present invention, the core may be a spherical particle having a size of 150 to 350 µm.

In an embodiment according to the present invention, an angle of repose of a powder containing a plurality of PVDC-based composites may be 28 or less.

In an embodiment according to the present invention, the PVDC-based composite may further satisfy the following Relational Expression 1.

$$0.8 < B/A < 0.92 \qquad \text{[Relational Expression 1]}$$

In Relational Expression 1, A is an angle of repose of a powder containing a plurality of PVDC-based polymer particles that do not include the shell, and B is an angle of repose of a powder containing a plurality of PVDC-based composites.

In another general aspect, a method for preparing a polyvinylidene chloride (PVDC)-based composite includes: a) preparing a first mixed solution containing a PVDC-based polymer; b) preparing a second mixed solution by adding wax to the first mixed solution; and c) drying the second mixed solution, wherein the wax is nano-sized particles.

In an embodiment according to the present invention, the wax may be two or more types of wax including acrylic wax.

In an embodiment according to the present invention, the step c) may be performed at a temperature higher than a glass transition temperature (Tg) of the acrylic wax.

In an embodiment according to the present invention, a temperature in the drying may be 80 to 140° C.

In still another general aspect, a food packaging film contains the PVDC-based composite according to an embodiment of the present invention.

Advantageous Effects

As set forth above, the PVDC-based composite according to the present invention may maximize flowability of the particles, such that feeding non-uniformity of the particles may be prevented in a manufacturing process of a PVDC film, thereby manufacturing a film having a uniform thickness.

Further, the flowability of the PVDC-based composite particles is improved, such that the acceleration of PVDC decomposition may be suppressed, thereby preventing generation of HCl gas.

DESCRIPTION OF THE INVENTION

The advantages and features of the present invention and methods accomplishing them will become apparent from embodiments described below in detail with the accompanying drawings. However, the present invention is not limited to embodiments to be described below, but may be implemented in various different forms. These embodiments will be provided only in order to make the present invention complete and allow those skilled in the art to completely recognize the scope of the present invention, and the present invention will be defined by the scope of the claims. Specific contents for implementing the present invention will be described in detail with reference to the accompanying drawings. The same reference numerals refer to the same components regardless of the drawings. The term "and/or" includes any and all combinations of one or more of the listed items.

Unless defined otherwise, all terms (including technical and scientific terms) used in the present specification have the same meanings as commonly understood by those skilled in the art to which the present invention pertains. Throughout the present specification, unless explicitly described to the contrary, "comprising" any components will be understood to imply further inclusion of other components rather than the exclusion of any other components. In addition, the singular forms are intended to include the plural forms, unless the context clearly indicates otherwise.

In the present specification, it will be understood that when an element such as a layer, a film, a region, a plate, or the like, is referred to as being "on" or "above" another element, it may be directly on another element or may have an intervening element present therebetween.

The present invention provides a polyvinylidene chloride (PVDC)-based composite including: a core containing a PVDC-based polymer; and a shell surrounding the core and containing wax, wherein the wax is nano-sized particles.

The PVDC-based polymer is a synthetic resin containing vinylidene chloride (VDC) as a basic polymer, has high gas and moisture barrier properties, is particularly excellent in a moisture-proofing effect, and may be sterilized at a high temperature of 120° C., and therefore the PVDC-based polymer is used in a film for packaging food including retort food. However, in the case of the PVDC-based polymer, as described above, carbon carbide is formed by carbonization during thermal processing due to its structural characteristics, which may cause non-uniformity in a thickness of a film or difficulties in film processing itself. The formation of the carbon carbide is further accelerated by a reduction in flowability of the PVDC-based particles, and as a result, a variation in thickness of the film is increased, which causes deterioration of the quality.

In the present invention, a surface roughness of the composite particle is reduced through the PVDC-based composite in which a shell containing nano-sized wax is introduced into a PVDC-based polymer core, thereby significantly improving the flowability of the particles.

The PVDC-based polymer may be one or more selected from the group consisting of a homopolymer and a copolymer that contain vinylidene chloride (VDC), and specifically, may be a copolymer containing one or more comonomers selected from the group consisting of vinyl chloride (VC) and methyl acrylate (MA).

The PVDC-based copolymer may contain 2 to 25 wt % of the comonomers. Specifically, a content of the VC may be 10 to 23 wt %, and preferably 13 to 20 wt %, with respect to the VDC-VC copolymer, and a content of the MA may be 2 to 12 wt %, and preferably 3 to 9 wt %, with respect to the VDC-MA copolymer. Within the above range, a melting temperature of the PVDC copolymer may be decreased while exhibiting crystallinity and a degree of crystallinity for maintaining moisture and gas barrier properties, such that the ease of thermal processing may be increased. Specifically, as the melting temperature of the PVDC copolymer is decreased, a difference between a decomposition temperature and a melting temperature of the PVDC-based polymer is increased in proportion thereto. In the present invention, as the PVDC-based polymer contains the VDC-VC copolymer and/or the VDC-MA copolymer, it is possible to secure a temperature range of 30° C. or higher, and preferably 50° C. or higher, in which melting processing is possible at a temperature lower than the decomposition temperature of the PVDC polymer, such that process efficiency may be improved.

The core may be a spherical particle having a particle size of 150 to 350 μm, and preferably 200 to 300 μm, and the core particle is a porous particle and may have a surface roughness ranging from several μm and several tens of μm. In this case, the particle size may be referred to as D50, and D50 refers to a particle diameter when a cumulative volume from a small particle size accounts for 50% in measuring a particle size distribution by a laser scattering method. In this case, as for D50, the particle size distribution may be measured by collecting a sample according to KS A ISO 13320-1 standard using Mastersizer 3000 manufactured by Malvern Panalytical Ltd. Specifically, in the case of dry analysis, D50 may be measured by floating the particles in the air, and in the case of wet analysis, ethanol may be used as a solvent, and if necessary, the particles may be dispersed using an ultrasonic disperser, and then, a volume density may be measured.

A thickness of the shell containing the wax may be 10 nm to 20 μm, preferably 10 nm to 15 μm, and more preferably 30 nm to 10 μm. Within the above range, a decrease in the surface roughness alleviation effect due to a thin thickness of the shell may be suppressed, and the problem of deterioration in the barrier properties due to an excessively thick thickness of the shell may be prevented.

The wax may be one or more selected from the group consisting of petroleum/coal-derived wax extracted from petroleum or coal, animal and vegetable wax, amide-based synthetic wax, olefin-based synthetic wax, organosilicon polymer wax, and modified wax thereof. Specific examples thereof include, but are not limited to, paraffin, microcrystalline wax, montan wax, polyethylene wax, oxidized polyethylene (PE) wax, polypropylene wax, oxidized polypropylene wax, organosilicon polymer (polysiloxane) wax, polyoxyethylene glycol wax, halogenated hydrocarbon wax, hydrogenated wax, acrylic wax, and carnauba wax.

The wax according to an embodiment of the present invention may be two or more types of wax including acrylic wax.

The acrylic wax may have a glass transition temperature (Tg) similar to a drying temperature during a preparation process of the PVDC-based composite. Specifically, the drying process is a step of drying a mixed solution of a PVDC-based polymer and wax, and may be performed at a temperature of 80 to 140° C. and preferably 90 to 130° C., such that acrylic wax having a Tg of 80 to 140° C. and preferably 90 to 130° C. may be contained. The drying process may be performed through a fluid drying process commonly used for drying a particulate polymer product. Specifically, the fluid drying is a method of blowing dry gas into the particles to make the particles in a floating state and drying the particles, in which in the drying process, collisions may occur between the particles and between the particles and a surface of a dryer. The dryer may have various shapes and structures such as a vertical type, a horizontal type, a batch type, and a semi-batch type, but is not limited thereto. As the acrylic wax is contained, in the drying process, the acrylic wax undergoes a softening process to cause the collisions between the particles or between the particles and a surface of a device (the surface of the dryer) so as to induce particle deformation. Such a process of deforming the wax particle is a process in which a surface coating of the PVDC-based polymer core is flattened, and may reduce the surface roughness of the core. As a result, the PVDC-based composite has a smooth surface, such that the flowability may be significantly increased. In this case, the type of wax other than the acrylic wax is not particularly limited, but may be olefin-based synthetic wax, oxidized olefin-based synthetic wax, natural wax, or silicone polymer-based wax.

A particle size of the wax may be 30 to 280 nm, preferably 30 to 250 nm, and more preferably 50 to 200 nm, and in this case, the particle size may refer to D50. As described above, the PVDC core particle has a particle size of 150 to 350 μm, and is a porous particle having a surface roughness ranging from several μm and several tens of μm. Therefore, the wax particle having the particle size range described above enters a groove in the surface of the core particle or covers a surface of the groove, such that the surface roughness of the core particle may be reduced.

A coating coverage rate of the PVDC-based composite according to an embodiment of the present invention may be 32 to 99%, preferably 60 to 99%, and more preferably 90 to 99%. In particular, in a case of coating using wax having a particle size within the range described above, an excellent coating rate and uniform coating property may be obtained, resulting in a coating coverage rate of 97% or more. Accordingly, the flowability of the particles may be increased. On the other hand, in a case of coating using wax having a particle size larger than the range described above, a contact surface between the wax particle and the PVDC core particle is relatively reduced, which makes it impossible to sufficiently fill the groove in the surface of the core particle. Accordingly, a relatively low coating coverage rate and low particle flowability may be exhibited.

An angle of inclination, that is, an angle of repose, measured by free fall evaluation of the powder containing a plurality of PVDC composites according to an embodiment of the present invention may be 28 or less, and preferably 24 to 28. The angle of repose is the maximum angle of inclination at which unconsolidated sediment may be deposited on a slope without running down. That is, the angle of repose is a large angle between the natural surface of the powder and the horizontal plate in a static equilibrium state, and is generally smaller than the internal friction of the material by 5 to 10. The smaller the angle of repose, the better the flowability of the powder. Specifically, as for the angle of repose, after 140 g of the powder is put in a funnel and is allowed to fall freely to the floor from a height of 20 cm, left/right inclination angles of a pile of the powder piled on the floor are measured, an average value thereof is used, and a final value is calculated by performing this operation three times in the same manner. In this case, an angle of repose of a powder containing PVDC-based polymer particles that do not include the shell is 30.7, and in a case of a powder containing the PVDC-based composite according to the present invention, an angle of repose under the conditions described above may be reduced by about 9%. In general, flowability of a powder having an angle of repose of 30 to 40 is evaluated as "Fair to passable", and flowability of a powder having an angle of repose of 25 to 30 is evaluated as "Good". Therefore, the flowability of the powder containing the PVDC-based composite that has an angle of repose of 28 or less is significantly excellent, and due to the increase in flowability of the powder, a raw material may be smoothly fed and extruded in a thermal processing process such as extrusion molding, resulting in manufacturing of a film having a uniform thickness.

The PVDC-based composite may further satisfy the following Relational Expression 1.

$$0.8 < B/A < 0.92$$ [Relational Expression 1]

In Relational Expression 1, A is an angle of repose of a powder containing a plurality of PVDC-based polymer particles that do not include the shell, and B is an angle of repose of a powder containing a plurality of PVDC-based core-shell composite particles. In Relational Expression 1, A is an angle of repose of a powder containing only a plurality of PVDC-based polymer core particles that do not include the shell, and may be 30.7 when measured in the same manner as that of the method for measuring the angle of repose.

As the PVDC-based composite according to an embodiment of the present invention satisfies Relational Expression 1, the crystallinity and the degree of crystallinity for maintaining moisture and gas barrier properties may be exhibited, and the flowability of the particles may be increased, such that excellent barrier properties and excellent flowability may be exhibited at the same time.

The present invention also provides a method for preparing a polyvinylidene chloride (PVDC)-based composite, the method including: a) preparing a first mixed solution containing a PVDC-based polymer; b) preparing a second mixed solution by adding wax to the first mixed solution; and c) drying the second mixed solution, wherein the wax is nano-sized particles.

The step a) is a step of preparing a first mixed solution, and the first mixed solution may further contain a stabilizer, a suspending agent, and a solvent. In this case, the step a) may be performed under stirring at 50 to 100° C. and preferably 70 to 100° C. and 100 to 500 rpm.

Specifically, the first mixed solution may contain: based on 100 parts by weight of the PVDC-based polymer particles, 0.1 to 0.3 parts by weight and preferably 0.15 to 0.25 parts by weight of a stabilizer; 0.03 to 0.12 parts by weight and preferably 0.05 to 0.10 parts by weight of a suspending agent; and 70 to 250 parts by weight and preferably 100 to 200 parts by weight of a solvent. The stabilizer is used to stabilize PVDC, and may be an inorganic stabilizer. Non-limiting examples of the stabilizer include tetrasodium pyrophosphate (TSPP), magnesium hydroxide ($Mg(OH)_2$), potassium hydroxide (KOH), and calcium hydroxide ($Ca(OH)_2$). Examples of the suspending agent include, but are not limited to, hydroxypropyl methylcellulose (HPMC). The solvent may be one or more selected from water, distilled water, and demineralized (Demi) water, but is not limited thereto. In this case, a pH value of the mixed solution may be adjusted to 6 to 7, and an acidic aqueous solution such as hydrochloric acid (HCl), sulfuric acid ($H_2SO_4$), or nitric acid ($HNO_3$) may be used for pH adjustment, but is not limited thereto.

The step b) is a step of preparing a second mixed solution containing wax, and the second mixed solution may be prepared by adding wax to the first mixed solution and then mixing the wax and the first mixed solution at 100 to 500 rpm. In this case, the wax may be contained in an amount of 1 to 10 parts by weight, preferably 1 to 8 parts by weight, and more preferably 1 to 5 parts by weight, based on 100 parts by weight of the PVDC-based polymer particles.

A particle size (D50) of the wax may be 30 to 300 nm, preferably 30 to 280 nm, and more preferably 50 to 200 nm, and the wax may be two or more types of wax including acrylic wax. In this case, the acrylic wax may be contained in an amount of 20 to 100 parts by weight, preferably 40 to 100 parts by weight, and more preferably 60 to 90 parts by weight, based on 100 parts by weight of the entire wax. The types of wax other than the acrylic wax are not particularly limited, but may be olefin-based synthetic wax or natural wax. In this case, the wax may be used in a powder state or a state of being prepared as a suspension, and a content of the wax based on 100 parts by weight of the suspension may be 20 to 60 parts by weight and preferably 25 to 50 parts by weight.

After the step b), a process of adding an inorganic salt may be further performed to shorten a wax coating time. In this case, the process may be performed under the same temperature and stirring speed conditions as those in the step a), and a stirring time may be 1 minute to 60 minutes and preferably 2 to 40 minutes.

The inorganic salt refers to a material that is water-soluble and dissolves in water to dissociate into a cation and an anion, and non-limiting examples thereof include sodium chloride (NaCl), potassium chloride (KCl), lithium chloride (LiCl), magnesium chloride ($MgCl_2$), and calcium chloride ($CaCl_2$). The inorganic salt may be included in an amount of 0.2 to 5 parts by weight and preferably 0.5 to 3 parts by weight based on 100 parts by weight of the PVDC-based polymer particles.

After the process of adding the inorganic salt, stirring may be stopped and a vacuum filtering process for separating a product from water may be further performed. In this case, a filter is not particularly limited as long as it has a commonly used hole size of several μm to several tens of μm.

The step c) is a drying step, and may be performed at a temperature higher than a glass transition temperature (Tg) of the acrylic wax used in the step b) under conditions of aeration using an inert gas such as nitrogen or argon. Specifically, the drying temperature may be 80 to 140° C., preferably 90 to 130° C., and more preferably 90 to 120° C., and the drying may be performed for 4 to 15 hours and preferably 6 to 14 hours. In addition, as the drying process is performed under the conditions described above, the acrylic wax is softened and the coating layers of the acrylic wax and the other wax particles are induced to deform, such that the surface roughness of the PVDC-based composite particles may be significantly reduced, thereby increasing the flowability of the PVDC-based composite particles.

The present invention also provides a food packaging film containing the PVDC-based composite according to an embodiment of the present invention. Specifically, the film may include an inner layer, a barrier layer, and an outer layer.

The inner layer is a layer in direct contact with food, and is not particularly limited as long as it is a polymer material generally used in a film for packaging food, such as a polyethylene and polyethylene copolymer, a polypropylene and polypropylene copolymer, polyester, and polyamide. The inner layer may further contain a rubber-based resin and an antistatic agent. The rubber-based resin may be one or more selected from the group consisting of latex, styrene-butadiene-styrene (SBS) rubber, styrene-butadiene (SB) rubber, styrene-isoprene-styrene (SIS) rubber, styrene-ethylene-butylene-styrene (SEBS) rubber, ethylene-propylene-diene (EPDM) rubber, ethylene-propylene (EP) rubber, and a tackifier that imparts viscosity, and flexibility and sealing may be increased by further containing the rubber-based and tackifiers. In addition, the antistatic agent is not particularly limited as long as it is known in the art, but a low molecular weight antistatic agent may be used in terms of cost reduction effect.

The barrier layer is a layer that blocks gas and moisture, and may contain a resin composition containing the PVDC-based composite according to an embodiment of the present invention.

The outer layer is a layer in contact with the outside, and serves to protect a material packaged inside by resisting external impact and friction. A polymer material generally used as a film material may be used in the outer layer, and is not particularly limited as long as it is a polymer material generally used in a film for packaging food, such as polyethylene and a copolymer thereof, polypropylene and a copolymer thereof, polyester, or polyamide. The outer layer may further contain a rubber-based resin and an antistatic agent. The rubber-based resin may be one or more selected from the group consisting of latex, styrene-butadiene-styrene (SBS) rubber, styrene-butadiene (SB) rubber, styrene-isoprene-styrene (SIS) rubber, styrene-ethylene-butylene-styrene (SEBS) rubber, ethylene-propylene-diene (EPDM) rubber, and ethylene-propylene (EP) rubber, and is not particularly limited as long as it is a polymer material used in a film for packaging food.

The film may be further subjected to post-processing. In the post-processing of the film, stretching or orientation and electron beam crosslinking to increase mechanical strength of the film or to impart shrinkage properties to the film, a corona discharge treatment to enhance printing properties, thermal aging to impart dimensional stability, and the like may be performed, and in general, any processing method may be applied as long as it is performed for a food packaging material.

Hereinafter, preferred Examples and Comparative Examples of the present invention will be described. However, each of the following Examples is merely a preferred example of the present invention, and the present invention is not limited to the following Examples.

Example 1

350 g of a dried PVDC powder, 0.27 g of Methocel, and 0.66 g of TSPP were added to 486 g secondary distilled water, and then a few drops of 1 N HCl were added dropwise to set a pH to 6.3. A dispersion was prepared by stirring and dispersing the mixture at 90° C. and 400 rpm for 30 minutes. Next, wax was added according to the composition shown in Table 1, and then stirring was performed for 10 minutes, thereby preparing a mixed solution.

After a NaCl aqueous solution at a concentration of 21.30 wt % was added to the mixed solution, stirring was performed for 15 minutes, and then vacuum filtering was performed. Thereafter, a product was dried. First, a bottom of a glass tube having a diameter of 5 cm and a length of 30 cm was filled with glass wool, the product was placed in the glass tube, an upper portion of the glass tube was blocked with glass wool, and then nitrogen gas was aerated from the bottom of the glass tube. The outside of the glass tube was wound with an electrically operated heating cable, and drying was performed at 100° C. for 12 hours, thereby preparing a polyvinylidene chloride (PVDC)-based composite.

Examples 2 to 5

The same procedure as that of Example 1 was performed, except that wax was added according to the composition of Table 1.

Example 6

The same procedure as that of Example 1 was performed, except that the drying process was performed at 60° C. instead of 100° C.

Comparative Example 1

The same procedure as that of Example 1 was performed, except that wax was not added.

Comparative Example 2

A mixture was obtained by dry-blending 300 g of a dried PVDC powder and 1.5 g of wax B (A-C 619A).

Evaluation Methods

1. Scanning Electron Microscope (SEM) Analysis

Figure 1:
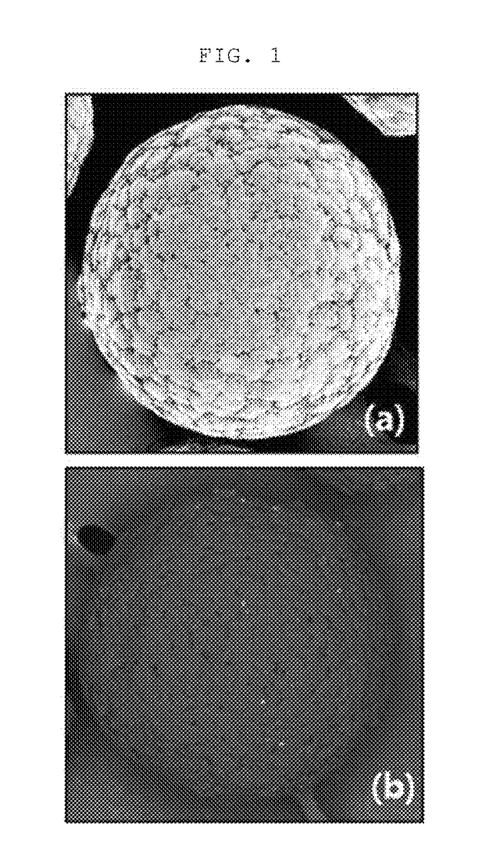
FIG. 1 is a view illustrating a scanning electron microscope (SEM) image of a core-shell composite according to an embodiment of the present invention, in which (a) is a view illustrating an SEM image of a polyvinylidene chloride (PVDC) polymer core particle before wax coating, and (b) is an SEM image of a PVDC-based composite including a wax shell layer.
Figure 2:
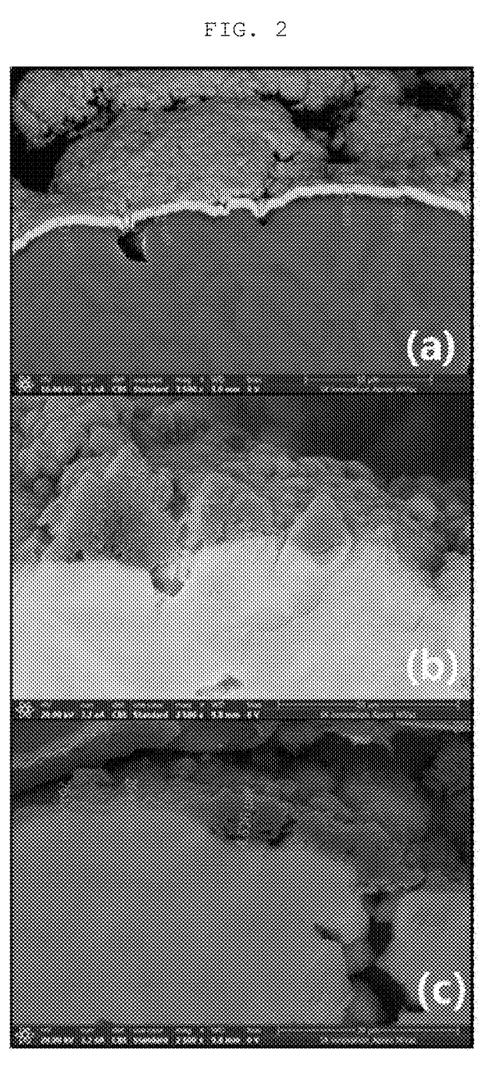
FIG. 2 is a view illustrating a scanning electron microscope (SEM) image of a core-shell composite according to an embodiment of the present invention, in which (a) to (c) are views illustrating thicknesses of a shell layer measured at different positions of the composite.

SEM analysis was performed on the PVDC-based composite prepared according to Example 2. The results thereof are illustrated in FIGS. 1 and 2. In order to analyze the shape of PVDC, Apreo device manufactured by FEI Company was used, the analysis was performed under conditions of a voltage of 2.0 to 2.5 kV, a current of 1.6 to 3.2 nA, and a working distance of 10 mm, but optimization within the conditions was performed according to the condition of the specimen.

Part (a) of FIG. 1 is a view illustrating an SEM image of a PVDC polymer core particle before wax coating, and part (b) of FIG. 1 is an SEM image of a PVDC-based composite including a wax shell layer.

FIG. 2 is a view illustrating a thickness of the wax shell layer formed on a surface of the PVCD particle in the PVDC-based composite after wax coating, in which (a) to (c) are views illustrating thicknesses of the shell layer measured at different positions.

As can be seen in FIG. 1, it could be confirmed that the shell layer containing wax was formed on the entire surface of the PVDC core particle, and as can be seen in FIG. 2, it could be confirmed that the shell layer having a thickness of 55 nm to 10 μm was formed on the surface of the PVDC polymer core.

2. Measurement of Coating Coverage Rate

A coating coverage rate was measured using the SEM images of the PVDC-based composites prepared according to Examples 1 to 6. The results thereof are shown in Table 1.

The coating coverage rate was calculated using a bright/dark ratio of the SEM image of the PVDC-based composite after wax coating. At this time, in a case where the wax coating was not efficiently performed, a mixture of bright and dark parts appeared, and in a case where the coating efficiency was excellent, only a dark image appeared.

As shown in Table 1, in all the cases of Examples 1 to 4, the coverage rate was 97% or more, and thus it could be confirmed from this that the shell layer containing wax was uniformly coated on the surface of the PVDC-based polymer core.

In the case of Example 5, it was determined that since the particle size of the wax F mixed with the acrylic wax A was 284 nm, which was significantly larger than those of Examples 2 to 4, the groove in the surface of the core particle was not sufficiently filled with the particles of the wax due to a relatively small of the contact surface with the PVDC core particles, and therefore a relatively low coverage rate was exhibited. In the case of Example 6, it was determined that as the drying process was performed at 60° C. instead of 100° C., the acrylic wax A was not softened well, and therefore a low particle flowability was exhibited.

3. Measurement of Angle of Repose

An angle of repose of the powder containing the PVDC-based composite or mixture prepared by each of the Examples 1 to 6 and Comparative Examples 1 and 2 was measured. The results thereof are shown in Table 1.

Specifically, after 140 g of each powder was put in a funnel and was allowed to fall freely to the floor from a height of 20 cm, left/right inclination angles of a pile of the powder piled on the floor were measured, an average value thereof was used, and an average value was calculated by performing this operation three times in the same manner.

As shown in Table 1, in the case of the PVDC-based polymer core particle that did not include a shell layer (Comparative Example 1), the angle of repose was 30.7, and in the case of the simple dry mixing of the PVDC-based polymer core particles and the wax B (Comparative Example 2), the angle of repose was 29.2, which was similar to that of Comparative Example 1.

On the other hand, in all the cases of the PVDC-based composites prepared according to Examples 1 to 6, the value of repose angle was 29 or less, and it was determined from this that the flowability was increased due to the formation of the shell layer containing the acrylic wax A on the surface of the PVDC-based polymer core. In particular, in the cases of Examples 2 to 4 in which both the acrylic wax A (first wax) and the second wax having a particle size of 150 nm or less were contained, the value of repose angle was 26 or less, and it was determined that the groove present in the surface of the PVDC-based polymer core was uniformly filled with the second wax particles having a size of 150 nm or less, and thus the flowability of the particles was improved according to a reduction in surface roughness.

In the case of Example 5, it was determined that, due to the use of the second wax F having a particle size of 284 nm, the groove present in the surface of the PVDC-based polymer core was not sufficiently filled compared to Examples 1 to 4 using the second wax having a size of 150 nm or less, and thus a relatively high angle of repose was exhibited.

In the case of Example 6, it was determined that as the drying process was performed at 60° C. instead of 100° C., a reduction in surface roughness of the core according to the softening of the acrylic wax A was not sufficient, and thus the angle of repose was higher than those of Examples 1 to 5 in which the drying temperature was 100° C.

TABLE 1

| | First wax | | Second wax | | Drying temperature (° C.) | Coverage rate (%) | Angle of repose (°) |
|---|---|---|---|---|---|---|---|
| | Type (content) | Size (D50) (nm) | Wax 2 (content) | Size (D50) (nm) | | | |
| Comparative Example 1 | — | — | — | — | — | — | 30.7 |
| Comparative Example 2 | — | — | B (0.5) | 1 * 10³ to 1 * 10⁶ | — | — | 29.2 |
| Example 1 | A (2.0) | 111 | — | — | 100 | 99 | 27.8 |
| Example 2 | A (2.0) | | C (0.5) | 53 | 100 | 97.4 | 25 |
| Example 3 | A (2.0) | | D (0.5) | 65 | 100 | >99 | 25.6 |
| Example 4 | A (2.0) | | E (0.5) | 146 | 100 | 99 | 26 |
| Example 5 | A (2.0) | | F (0.5) | 284 | 100 | 33 | 28.3 |
| Example 6 | A (2.0) | | — | — | 60 | 99 | 28.8 |

In Table 1, the contents of the first wax and the second wax were wt % of the first wax and wt % of the second wax, respectively, with respect to the total weight of the prepared PVDC-based composite, and A(trade name: Plastistrength L1000, Arkema) was used as the first wax, and B (trade name: A-C 619A, Honeywell), C (trade name: ME93135, Michelman), D (trade name: ME 61335, Michelman), E (trade name: ML160, Michelman), and F (trade name: ME98040, Michelman) were used as the second wax. As PVDC, (trade name: XU 32034.03, SK Global Chemical) was used.

The invention claimed is:

1. A polyvinylidene chloride (PVDC)-based composite comprising:
    a core comprising a PVDC-based polymer; and
    a shell surrounding the core and comprising wax,
    wherein the wax is nano-sized particles.

2. The PVDC-based composite of claim 1, wherein a particle size of the wax is 30 to 280 nm.

3. The PVDC-based composite of claim 1, wherein the wax is one or more selected from the group consisting of petroleum/coal-derived wax extracted from petroleum or coal, animal and vegetable wax, amide-based synthetic wax, olefin-based synthetic wax, organosilicon polymer wax, and modified wax thereof.

4. The PVDC-based composite of claim 3, wherein the wax is two or more types of wax including acrylic wax.

5. The PVDC-based composite of claim 1, wherein a thickness of the shell is 30 nm to 10 μm.

6. The PVDC-based composite of claim 1, wherein the PVDC-based polymer is one or more selected from the group consisting of a homopolymer and a copolymer that comprise vinylidene chloride (VDC).

7. The PVDC-based composite of claim 6, wherein the PVDC-based polymer is a copolymer comprising one or more comonomers selected from the group consisting of vinyl chloride (VC) and methyl acrylate (MA).

8. The PVDC-based composite of claim 7, wherein the PVDC-based polymer comprises 2 to 25 wt % of the comonomers.

9. The PVDC-based composite of claim 1, wherein the core is a spherical particle having a size of 150 to 350 μm.

10. The PVDC-based composite of claim 1, wherein an angle of repose of a powder comprising a plurality of PVDC-based composites is 28 or less.

11. The PVDC-based composite of claim 10, wherein the PVDC-based composite further satisfies the following Relational Expression 1:

$$0.8 < B/A < 0.92 \quad \text{[Relational Expression 1]}$$

in Relational Expression 1, A is an angle of repose of a powder comprising a plurality of PVDC-based polymer particles that do not comprise the shell, and B is an angle of repose of a powder comprising a plurality of PVDC-based composites.

12. A method for preparing a polyvinylidene chloride (PVDC)-based composite, the method comprising the steps of:
    a) preparing a first mixed solution comprising a PVDC-based polymer;
    b) preparing a second mixed solution by adding wax to the first mixed solution; and
    c) drying the second mixed solution,
    wherein the wax is nano-sized particles.

13. The method of claim 12, wherein the wax is two or more types of wax including acrylic wax.

14. The method of claim 13, wherein step c) is performed at a temperature higher than a glass transition temperature (Tg) of the acrylic wax.

15. The method of claim 12, wherein a temperature in the drying is 80 to 140° C.

16. A food packaging film comprising the PVDC-based composite of claim 1.

\* \* \* \* \*